US009751979B2

(12) United States Patent
Son et al.

(10) Patent No.: US 9,751,979 B2
(45) Date of Patent: *Sep. 5, 2017

(54) COPOLYCARBONATE AND COMPOSITION CONTAINING THE SAME

(71) Applicant: LG CHEM, LTD., Seoul (KR)

(72) Inventors: Young Wook Son, Daejeon (KR); Hyong Min Bahn, Daejeon (KR); Young Young Hwang, Daejeon (KR); Jung Jun Park, Daejeon (KR); Moo Ho Hong, Daejeon (KR); Ki Jae Lee, Daejeon (KR); Byoung Kyu Chun, Daejeon (KR); Un Ko, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/029,081

(22) PCT Filed: Dec. 4, 2015

(86) PCT No.: PCT/KR2015/013248
§ 371 (c)(1),
(2) Date: Apr. 13, 2016

(87) PCT Pub. No.: WO2016/089173
PCT Pub. Date: Jun. 9, 2016

(65) Prior Publication Data
US 2016/0326314 A1  Nov. 10, 2016

(30) Foreign Application Priority Data

Dec. 4, 2014  (KR) .................. 10-2014-0173005
Jul. 24, 2015  (KR) .................. 10-2015-0105367
Dec. 3, 2015  (KR) .................. 10-2015-0171780

(51) Int. Cl.
C08L 69/00  (2006.01)
C08G 64/18  (2006.01)
C08G 64/08  (2006.01)
C08G 64/38  (2006.01)
C08G 77/448  (2006.01)
(Continued)

(52) U.S. Cl.
CPC ........... *C08G 64/085* (2013.01); *C08G 64/06* (2013.01); *C08G 64/1666* (2013.01); *C08G 64/1691* (2013.01); *C08G 64/18* (2013.01); *C08G 64/186* (2013.01); *C08G 64/24* (2013.01); *C08G 64/307* (2013.01); *C08G 64/38* (2013.01); *C08G 77/448* (2013.01); *C08J 5/00* (2013.01); *C08K 5/3475* (2013.01); *C08L 69/00* (2013.01); *C08L 69/005* (2013.01); *C08L 83/04* (2013.01); *C08L 83/10* (2013.01); *C08L 2201/10* (2013.01); *C08L 2205/02* (2013.01); *C08L 2205/025* (2013.01)

(58) Field of Classification Search
CPC .......................... C08G 64/186; C08G 77/448
See application file for complete search history.

(56) References Cited

U.S. PATENT DOCUMENTS 3,819,744 A  6/1974  Buechner et al.
5,137,949 A  8/1992  Paul et al.
(Continued)

FOREIGN PATENT DOCUMENTS

CN  101124282 A  2/2008
CN  101585961 A  11/2009
(Continued)

OTHER PUBLICATIONS

Chemical Abstract of US2016/0251481, Mar. 2016, 3 pages.
Chemical Abstract registry No. 163617-O0-3, Jun. 1995, 1 page.

*Primary Examiner* — David Buttner
(74) *Attorney, Agent, or Firm* — Dentons US LLP

(57) ABSTRACT

Disclosed is a polycarbonate composition including a polycarbonate; and a copolycarbonate, where the copolycarbonate includes an aromatic polycarbonate-based first repeating unit; and aromatic polycarbonate-based second repeating units having siloxane bonds, which include a repeating unit represented by Chemical Formula 2 and a repeating unit represented by Chemical Formula 3, where the copolycarbonate has a melt index (MI) of 3 to 9 g/10min as measured in accordance with ASTM D1238 (300° C., 1.2 kg conditions), and a transparency of 87 to 91% as measured in accordance with ASTM D1003 (layer thickness of 3 mm):

[Chemical Formula 2]

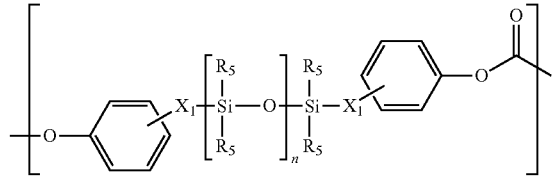

[Chemical Formula 3]

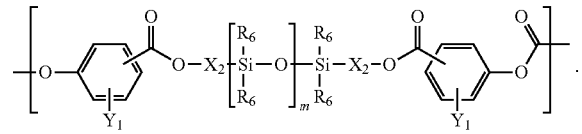

The copolycarbonate in the composition exhibits an excellent transparency and a high spiral flow while having a high impact strength at room temperature and a low melt index.

14 Claims, No Drawings

(51) Int. Cl.
C08J 5/00        (2006.01)
C08G 64/16       (2006.01)
C08G 64/06       (2006.01)
C08G 64/30       (2006.01)
C08K 5/3475      (2006.01)
C08L 83/04       (2006.01)
C08G 64/24       (2006.01)
C08L 83/10       (2006.01)

(56) References Cited

U.S. PATENT DOCUMENTS

| | | |
|---|---|---|
| 5,324,454 A | 6/1994 | Takata et al. |
| 5,380,795 A | 1/1995 | Gosens et al. |
| 5,455,310 A | 10/1995 | Hoover et al. |
| 5,502,134 A | 3/1996 | Okamoto et al. |
| 5,608,026 A | 3/1997 | Hoover et al. |
| 5,783,651 A | 7/1998 | König et al. |
| 5,932,677 A | 8/1999 | Hoover et al. |
| 6,001,929 A | 12/1999 | Nodera et al. |
| 6,252,013 B1 | 6/2001 | Banach et al. |
| 6,281,286 B1 | 8/2001 | Chorvath et al. |
| 6,780,956 B2 | 8/2004 | Davis |
| 7,135,538 B2 | 11/2006 | Glasgow et al. |
| 7,332,559 B2 | 2/2008 | Hong et al. |
| 7,432,327 B2 | 10/2008 | Glasgow |
| 7,498,401 B2 | 3/2009 | Agarwal |
| 7,524,919 B2 | 4/2009 | Hoover et al. |
| 7,691,304 B2 | 4/2010 | Agarwal et al. |
| 7,709,581 B2 | 5/2010 | Glasgow et al. |
| 7,718,733 B2 | 5/2010 | Juikar et al. |
| 8,030,379 B2 | 10/2011 | Nodera et al. |
| 8,084,134 B2 | 12/2011 | Malinoski et al. |
| 8,124,683 B2 | 2/2012 | Jung et al. |
| 8,389,648 B2 | 3/2013 | Adoni et al. |
| 8,466,249 B2 | 6/2013 | Gallucci et al. |
| 8,552,096 B2 | 10/2013 | Li et al. |
| 8,912,290 B2 | 12/2014 | Huggins et al. |
| 8,933,186 B2 | 1/2015 | Bahn et al. |
| 8,962,780 B2 | 2/2015 | Higaki et al. |
| 8,981,017 B2 | 3/2015 | Ishikawa |
| 9,062,164 B2 | 6/2015 | Kim et al. |
| 9,080,021 B2 | 7/2015 | Ishikawa et al. |
| 9,102,832 B2 | 8/2015 | Sybert et al. |
| 9,255,179 B2 | 2/2016 | Park et al. |
| 2003/0027905 A1 | 2/2003 | Mahood et al. |
| 2003/0065122 A1 | 4/2003 | Davis |
| 2004/0200303 A1 | 10/2004 | Inoue et al. |
| 2006/0148986 A1 | 7/2006 | Glasgow et al. |
| 2007/0093629 A1 | 4/2007 | Silva et al. |
| 2007/0135569 A1 | 6/2007 | Derudder |
| 2007/0241312 A1 | 10/2007 | Hikosaka |
| 2007/0258412 A1 | 11/2007 | Schilling et al. |
| 2008/0015289 A1 | 1/2008 | Siripurapu |
| 2008/0081895 A1 | 4/2008 | Lens et al. |
| 2008/0230751 A1 | 9/2008 | Li et al. |
| 2009/0087761 A1 | 4/2009 | Fukushima et al. |
| 2009/0326183 A1 | 12/2009 | Schultz et al. |
| 2010/0233603 A1 | 9/2010 | Hikosaka |
| 2012/0123034 A1 | 5/2012 | Morizur et al. |
| 2012/0251750 A1 | 10/2012 | Sybert et al. |
| 2012/0252985 A1 | 10/2012 | Rosenquist et al. |
| 2012/0271009 A1* | 10/2012 | Higaki ............ C08G 64/186 525/464 |
| 2012/0283393 A1 | 11/2012 | Ishikawa |
| 2013/0035441 A1 | 2/2013 | De Brouwer et al. |
| 2013/0082222 A1 | 4/2013 | Aoki |
| 2013/0186799 A1 | 7/2013 | Stam et al. |
| 2013/0190425 A1 | 7/2013 | Zhu et al. |
| 2013/0267665 A1 | 10/2013 | Huggins et al. |
| 2013/0274392 A1 | 10/2013 | Morizur et al. |
| 2013/0289224 A1 | 10/2013 | Bae et al. |
| 2013/0309474 A1 | 11/2013 | Peek et al. |
| 2013/0313493 A1 | 11/2013 | Wen et al. |
| 2013/0317142 A1 | 11/2013 | Chen et al. |
| 2013/0317146 A1 | 11/2013 | Li et al. |
| 2013/0317150 A1 | 11/2013 | Wan et al. |
| 2013/0331492 A1 | 12/2013 | Sharma |
| 2014/0106208 A1 | 4/2014 | Ishikawa et al. |
| 2014/0148559 A1 | 5/2014 | Kim et al. |
| 2014/0178943 A9 | 6/2014 | Shibuya et al. |
| 2014/0179843 A1 | 6/2014 | van der Mee et al. |
| 2014/0206802 A1 | 7/2014 | Bahn et al. |
| 2014/0323623 A1 | 10/2014 | Miyake et al. |
| 2015/0057423 A1 | 2/2015 | Kim et al. |
| 2015/0175802 A1 | 6/2015 | Sybert et al. |
| 2015/0197633 A1 | 7/2015 | Van Der Mee et al. |
| 2015/0210854 A1 | 7/2015 | Aoki |
| 2015/0218371 A1 | 8/2015 | Lee et al. |
| 2015/0307706 A1 | 10/2015 | Rosenquist et al. |
| 2015/0315380 A1 | 11/2015 | Bahn et al. |
| 2015/0344623 A1 | 12/2015 | Park et al. |
| 2015/0368484 A1 | 12/2015 | Shishaku et al. |
| 2016/0002410 A1 | 1/2016 | Iyer et al. |
| 2016/0122477 A1* | 5/2016 | Rhee ............... C08L 83/10 525/464 |
| 2016/0251481 A1 | 9/2016 | Hwang et al. |
| 2016/0297926 A1* | 10/2016 | Hwang ............ C08G 64/307 |
| 2016/0326312 A1 | 11/2016 | Park et al. |
| 2016/0326313 A1 | 11/2016 | Son et al. |
| 2016/0326314 A1 | 11/2016 | Son et al. |
| 2016/0326321 A1 | 11/2016 | Park et al. |
| 2016/0369047 A1 | 12/2016 | Hwang et al. |
| 2016/0369048 A1 | 12/2016 | Park et al. |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |

(56) References Cited

FOREIGN PATENT DOCUMENTS

| | | |
|---|---|---|
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 10-2015-0119823 A | 10/2015 |
| KR | 10-1563269 B1 | 10/2015 |
| KR | 2015-0134457 A | 12/2015 |
| TW | 201241043 A | 10/2012 |
| WO | 2012/060516 A1 | 5/2012 |
| WO | 2013/051557 A1 | 4/2013 |
| WO | 2013-058214 A1 | 4/2013 |
| WO | 2013/073709 A1 | 5/2013 |
| WO | 2013/100606 A1 | 7/2013 |
| WO | 2013-115538 A1 | 8/2013 |
| WO | 2013/115604 A1 | 8/2013 |
| WO | 2013/175445 A2 | 11/2013 |
| WO | 2013/175455 A1 | 11/2013 |
| WO | 2014/042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014-144673 A1 | 9/2014 |
| WO | 2015/011669 A2 | 1/2015 |
| WO | 2015/015445 A2 | 2/2015 |
| WO | WO-2015/041441 * | 3/2015 |

* cited by examiner

COPOLYCARBONATE AND COMPOSITION CONTAINING THE SAME

CROSS-REFERENCE TO RELATED APPLICATION(S)

This application is a National Stage Entry of International Application No. PCT/KR2015/013248, filed on Dec. 4, 2015, and claims the benefit of and priority to Korean Patent Application No. 10-2014-0173005, filed on Dec. 4, 2014, Korean Patent Application No. 10-2015-0105367, filed on Jul. 24, 2015, and Korean Patent Application No.10-2015-0171780, filed on Dec. 3, 2015, all of which are incorporated herein by reference in their entirety for all purposes as if fully set forth herein.

TECHNICAL FIELD

The present invention relates to a copolycarbonate and a composition comprising the same, and more specifically to a copolycarbonate being economically produced, and exhibiting an excellent transparency and a high spiral flow while having a high impact strength at room temperature and a low melt index, and to a composition comprising the same.

BACKGROUND OF ART

Polycarbonate resins are prepared by condensation-polymerization of an aromatic diol such as bisphenol A with a carbonate precursor such as a phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and a transparency and a melt index are lowered.

Given the above circumstances, the present inventors have conducted intensive studies to overcome the above-mentioned disadvantages encountered with the prior arts, and found that a copolycarbonate in which a specific siloxane compound is introduced in a main chain of the polycarbonate as described below exhibit an excellent transparency and a high spiral flow while having a high impact strength at room temperature and a low melt index. The present invention has been completed on the basis of such a finding.

DETAILED DESCRIPTION OF THE INVENTION

Technical Problem

It is an object of the present invention to provide a copolycarbonate exhibiting an excellent transparency and a high spiral flow while having a high impact strength at room temperature and a low melt index.

It is a further object of the present invention to provide a composition comprising the above-mentioned copolycarbonate.

Technical Solution

In order to achieve these objects, the present invention provides a copolycarbonate comprising: an aromatic polycarbonate-based first repeating unit; and one or more aromatic polycarbonate-based second repeating units having siloxane bonds, wherein the copolycarbonate has a melt index (MI) of 3 to 10 g/10 min as measured in accordance with ASTM D1238 (300° C., 1.2 kg conditions), and a transparency of 87 to 91% as measured in accordance with ASTM D1003 (layer thickness of 3 mm).

Preferably, the melt index is not less than 4 g/10 min, not less than 5 g/10 min, or not less than 6 g/10 min, and is not more than 9 g/10 min, or not more than 8 g/10 min.

Also, preferably, the copolycarbonate according to the present invention has a spiral flow of 16 to 25 cm as measured in accordance with ASTM D3123 (300° C., mold temperature of 80° C., capillary thickness of 1.5 mm, holding pressure of 2000 bar). In general, polycarbonates exhibit a low spiral flow if their melt index is low. However, the copolycarbonate according to the present invention exhibits a high spiral flow while having a low melt index as describe above. Thus, the copolycarbonate exhibiting a high spiral flow as in the present invention has excellent injection performance during injection molding of molded articles having large volume. Therefore, although the copolycarbonate has a low melt index, it can exhibit an excellent moldability. Preferably, the spiral flow is not less than 17 cm, or not less than 18 cm, and is not more than 24 cm, not more than 23 cm, not more than 22 cm, not more than 21 cm, or not more than 20 cm.

Also, preferably, the copolycarbonate according to the present invention has a ratio of the spiral flow and the melt index (cm/g/10 min) of 1.7 to 5.0. More preferably, the ratio is not less than 1.8, not less than 1.9, not less than 2.0, not less than 2.1, not less than 2.2, not less than 2.3, or not less than 2.4; and not more than 4.9, not more than 4.8, not more than 4.7, not more than 4.6, or not more than 4.5.

In addition, the copolycarbonate according to the present invention has a weight average molecular weight of 1,000 to 100,000 g/mol, preferably 25,000 to 60,000 g/mol, or 15,000 to 35,000 g/mol. More preferably, the above weight average molecular weight is not less than 20,000 g/mol, not less than 21,000 g/mol, not less than 22,000 g/mol, not less than 23,000 g/mol, not less than 24,000 g/mol, not less than 25,000 g/mol, not less than 26,000 g/mol, not less than 27,000 g/mol, or not less than 28,000 g/mol. Also, the weight average molecular weight is not more than 34,000 g/mol, not more than 33,000 g/mol, or not more than 32,000 g/mol.

In addition, the copolycarbonate according to the present invention has an impact strength at room temperature of 700 to 1000 J/m as measured at 23° C. in accordance with ASTM D256 (⅛ inch, Notched Izod). Further, preferably, the impact strength at room temperature is not less than 750 J/m, not less than 800 J/m, not less than 850 J/m, or not less than 900 J/m.

Further, the copolycarbonate according to the present invention has an impact strength at low-temperature of 700 to 950 J/m as measured at −30° C. in accordance with ASTM D256 (⅛ inch, Notched Izod). Preferably, the impact strength at low-temperature is not less than 750 J/m, or not less than 800 J/m.

Further, the mole ratio of the aromatic polycarbonate-based first repeating unit and the one or more aromatic polycarbonate-based second repeating units having siloxane bonds is preferably 1:0.004-0.006, and the weight ratio thereof is preferably 1:0.04-0.07.

Further, preferably, a copolycarbonate comprising two kinds of aromatic polycarbonate-based second repeating units having the siloxane bonds is provided.

In particular, the aromatic polycarbonate-based first repeating unit is formed by reacting an aromatic diol compound and a carbonate precursor, and it is preferably represented by the following Chemical Formula 1:

[Chemical Formula 1]

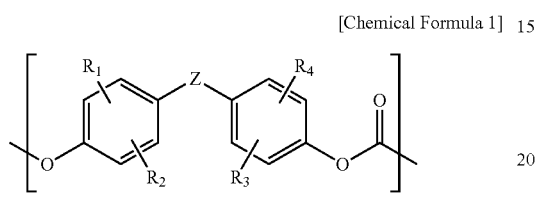

in the Chemical Formula 1, $R_1$, $R_2$, $R_3$, and $R_4$ are each independently hydrogen, $C_{1-10}$ alkyl, $C_{1-10}$ alkoxy, or halogen, Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Preferably, $R_1$, $R_2$, $R_3$, and $R_4$ are each independently hydrogen, methyl, chloro, or bromo.

Further, Z is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl or diphenylmethylene. Further, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and a carbonate precursor are reacted to form the repeating unit represented by Chemical Formula 1.

For example, when bisphenol A which is an aromatic diol compound, and triphosgene which is a carbonate precursor are polymerized, the repeating unit represented by Chemical Formula 1 is represented by the following Chemical Formula 1-1:

[Chemical Formula 1-1]

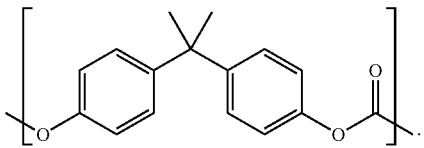

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromo phosgene and bishalo formate. Preferably, triphosgene or phosgene may be used.

The one or more aromatic polycarbonate-based second repeating units having siloxane bonds is formed by reacting one or more siloxane compounds and a carbonate precursor, and it comprises preferably a repeating unit represented by the following Chemical Formula 2 and a repeating unit represented by the following Chemical Formula 3:

[Chemical Formula 2]

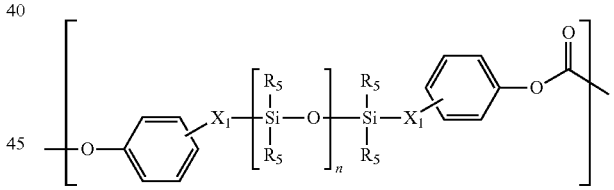

in the Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 10 to 200,

[Chemical Formula 3]

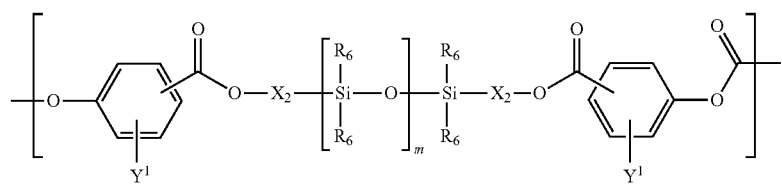

in the Chemical Formula 3, each of $X_2$ is independently $C_{1-10}$ alkylene, each of $Y_1$ is independently hydrogen, $C_{1-6}$ alkyl, halogen, hydroxy, $C_{1-6}$ alkoxy, or $C_{6-20}$ aryl, each of $R_6$ is independently hydrogen; or $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 10 to 200.

In Chemical Formula 2, each of $X_1$ is independently preferably $C_{2-10}$ alkylene, more preferably $C_{2-4}$ alkylene and most preferably propane-1,3-diyl.

Also, preferably, each of $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In addition, each of $R_5$ is independently preferably $C_{1-10}$ alkyl, more preferably $C_{1-6}$ alkyl, still more preferably $C_{1-3}$ alkyl and most preferably methyl.

Further, preferably, n is an integer of not less than 10, not less than 15, not less than 20, not less than 25, not less than 26, not less than 27, or not less than 28; and not more than 50, not more than 45, not more than 40, not more than 35, not more than 34, or not more than 33.

In Chemical Formula 3, each of $X_2$ is independently preferably $C_{2-10}$ alkylene, more preferably $C_{2-6}$ alkylene and most preferably isobutylene.

Further, preferably, $Y_1$ are hydrogen.

Further, preferably, each of $R_6$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, each of $R_6$ is independently preferably $C_{1-10}$ alkyl, more preferably $C_{1-6}$ alkyl, still more preferably $C_{1-3}$ alkyl, and most preferably methyl.

Preferably, m is not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 2 and the repeating unit represented by Chemical Formula 3 are, respectively, derived from a siloxane compound represented by the following Chemical Formula 2-1 and a siloxane compound represented by the following Chemical Formula 3-1:

[Chemical Formula 2-1]

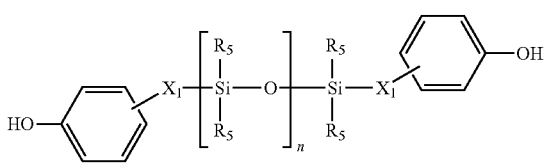

in the Chemical Formula 2-1, $X_1$, $R_5$ and n are the same as previously defined,

[Chemical Formula 3-1]

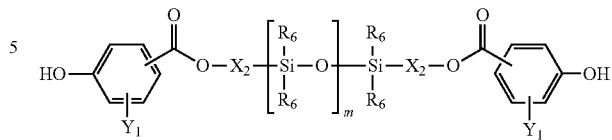

in the Chemical Formula 3-1, $X_2$, $Y_1$, $R_6$ and m are the same as previously defined.

As used herein, 'derived from a siloxane compound' means that a hydroxy group of the respective siloxane compound and a carbonate precursor are reacted to form the repeating unit represented by Chemical Formula 2 and the repeating unit represented by Chemical Formula 3. Further, the carbonate precursors that can be used for the formation of the repeating units represented by Chemical Formulae 2 and 3 are the same as those described for the carbonate precursor that can be used for the formation of the repeating unit represented by Chemical Formula 1 described above.

The methods for preparing the siloxane compound represented by Chemical Formula 2-1 and the siloxane compound represented by Chemical Formula 3-1 are represented by the following Reaction Schemes 1 and 2, respectively:

[Reaction Scheme 1]

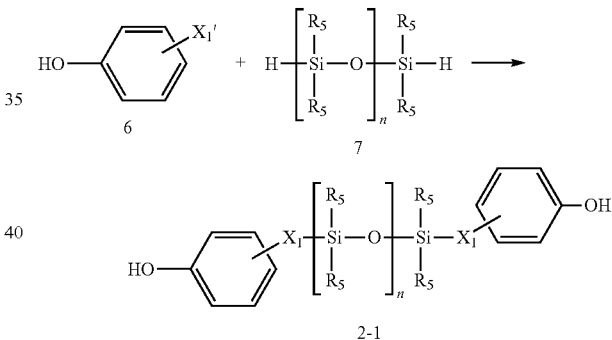

in the Reaction Scheme 1, $X_1'$ is $C_{2-10}$ alkenyl, and $X_1$, $R_5$ and n are the same as previously defined,

[Reaction Scheme 2]

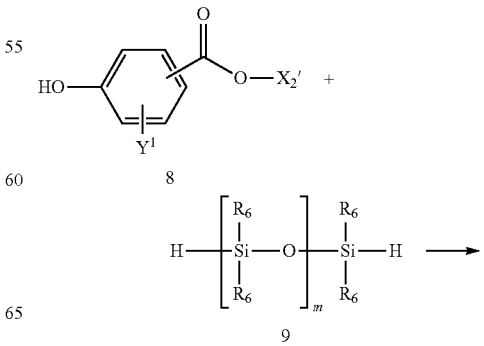

-continued

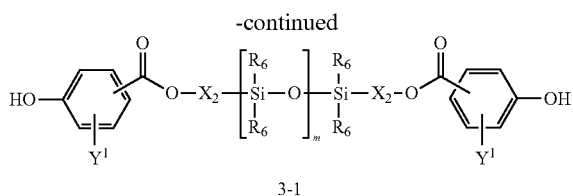

3-1 in the Reaction Scheme 2,
$X_2'$ is $C_{2-10}$ alkenyl, and
$X_2$, $Y_1$, $R_6$ and m are the same as previously defined.

In the Reaction Scheme 1 and Reaction Scheme 2, the reaction is preferably conducted in the presence of a metal catalyst. As the metal catalyst, a Pt catalyst is preferably used. The Pt catalyst used herein may include one or more selected from the group consisting of Ashby catalyst, Karstedt catalyst, Lamoreaux catalyst, Speer catalyst, $PtCl_2$ (COD), $PtCl_2$(benzonitrile)$_2$ and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by the Chemical Formulae 7 or 9.

Further, the above reaction temperature is preferably 80 to 100° C. Further, the above reaction time is preferably 1 to 5 hours.

In addition, the compounds represented by Chemical Formulae 7 or 9 can be prepared by reacting an organodisiloxane and an organocyclosiloxane in the presence of an acid catalyst, and n and m may be adjusted by adjusting the amount of the reactants. The reaction temperature is preferably 50 to 70° C. Also, the reaction time is preferably 1 to 6 hours.

The above organodisiloxane may include one or more selected from the group consisting of tetramethyldisiloxane, tetraphenyldisiloxane, hexamethyldisiloxane and hexaphenyldisiloxane. In addition, the above organocyclosiloxane may include, for example, organocyclotetrasiloxane. As one example thereof, octamethylcyclotetrasiloxane and octaphenylcyclotetrasiloxane and the like can be included.

The above organodisiloxane can be used in an amount of not less than 0.1 parts by weight, or not less than 2 parts by weight; and not more than 10 parts by weight, or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; and not more than 10 parts by weight, not more than 5 parts by weight or not more than 3 parts by weight, based on 100 parts by weight of the organocyclosiloxane.

In particular, by adjusting the content of the repeating unit represented by Chemical Formula 2 and the repeating unit represented by Chemical Formula 3, the impact resistance at low-temperature and melt index of the copolycarbonate can be improved simultaneously. Preferably, the weight ratio between the repeating units may be from 1:99 to 99:1. Preferably, the weight ratio is from 3:97 to 97:3, from 5:95 to 95:5, from 10:90 to 90:10, or from 15:85 to 85:15, and more preferably from 20:80 to 80:20. The weight ratio of the above repeating units corresponds to the weight ratio of siloxane compounds, for example the siloxane compound represented by Chemical Formula 2-1 and the siloxane compound represented by Chemical Formula 3-1.

Preferably, the repeating unit represented by Chemical Formula 2 is represented by the following Chemical Formula 2-2:

[Chemical Formula 2-2]

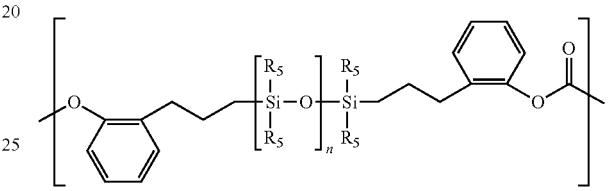

in the Chemical Formula 2-2, $R_5$ and n are the same as previously defined. Preferably, $R_5$ is methyl.

Also, preferably, the repeating unit represented by Chemical Formula 3 is represented by the following Chemical Formula 3-2:

[Chemical Formula 3-2]

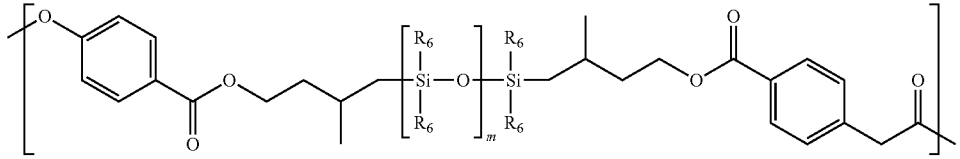

in the Chemical Formula 3-2, $R_6$ and m are he same as previously defined. Preferably, $R_6$ is methyl.

Further, preferably, the copolycarbonate according to the present invention comprises all of the repeating unit represented by Chemical Formula 1-1, the repeating unit represented by Chemical Formula 2-2, and the repeating unit represented by Chemical Formula 3-2.

Further, the present invention provides a method for preparing a copolycarbonate comprising a step of polymerizing the aromatic diol compound, the carbonate precursor and one or more siloxane compounds.

The aromatic diol compound, the carbonate precursor and the one or more siloxane compounds are the same as previously described.

During the polymerization, the one or more siloxane compounds can be used in an amount of not less than 0.1% by weight, not less than 0.5% by weight, not less than 1% by weight, not less than 1.5% by weight, not less than 2.0% by weight, not less than 2.5% by weight, or more than 3.0% by weight;

and not more than 20% by weight, not more than 10% by weight, not more than 7% by weight, not more than 5% by weight or not more than 4% by weight, based on 100% by weight in total of the aromatic diol compound, the carbonate precursor and the one or more siloxane compounds. Also, the above aromatic diol compound can be used in an amount of not less than 40% by weight, not less than 50% by weight, or not less than 55% by weight; and not more than 80% by weight, not more than 70% by weight, or not more than 65% by weight, based on 100% by weight in total of the aromatic diol compound, the carbonate precursor and the one or more siloxane compounds. The above carbonate precursor can be used in an amount of not less than 10% by weight, not less than 20% by weight, or not less than 30% by weight, and in an amount of not more than 60% by weight, not more than 50% by weight, or not more than 40% by weight, based on 100% by weight in total of the aromatic diol compound, the carbonate precursor and the one or more siloxane compounds.

Further, as the polymerization method, an interfacial polymerization method can be used as one example. In this case, there is an effect in that the polymerization reaction is possible at a low temperature under an atmospheric pressure, and the molecular weight is easily controlled. The above interfacial polymerization is preferably conducted in the presence of an acid binder and an organic solvent. Furthermore, the above interfacial polymerization may comprise, for example, the steps of conducting pre-polymerization, then adding a coupling agent and again conducting polymerization. In this case, the copolycarbonate having a high molecular weight can be obtained.

The materials used in the interfacial polymerization are not particularly limited as long as they can be used in the polymerization of polycarbonate. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonates. As one example, halogenated hydrocarbon such as methylene chloride or chlorobenzene can be used.

Further, during the interfacial polymerization, reaction accelerators, for example, a tertiary amine compound such as triethylamine, tetra-n-butyl ammonium bromide and tetra-n-butylphosphonium bromide or a quaternary ammonium compound or a quaternary phosphonium compound may be further used for accelerating the reaction.

In the interfacial polymerization, the reaction temperature is preferably 0 to 40° C. and the reaction time is preferably 10 minutes to 5 hours. Further, during the interfacial polymerization reaction, pH is preferably maintained at 9 or more, or 11 or more.

In addition, the interfacial polymerization may be conducted by further including a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight control is great.

The above molecular weight modifier is contained, for example, in an amount of not less than 0.01 parts by weight, not less than 0.1 parts by weight, or not less than 1 part by weight, and in an amount of not more than 10 parts by weight, not more than 6 parts by weight, or not more than 5 parts by weight, based on 100 parts by weight of the aromatic dial compound. Within this range, the required molecular weight can be obtained.

In addition, the present invention provides a polycarbonate composition comprising the above-mentioned copolycarbonate and polycarbonate.

The copolycarbonate may be used alone, but it can be used together with the polycarbonate as needed to thereby control the physical properties of the copolycarbonate.

The above polycarbonate is distinguished from the copolycarbonate according to the present invention in that a polysiloxane structure is not introduced in a main chain of the polycarbonate.

Preferably, the above polycarbonate comprises a repeating unit represented by the following Chemical Formula 4:

[Chemical Formula 4]

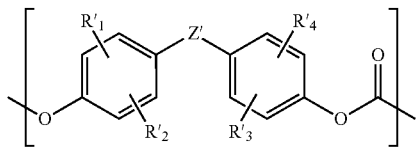

in the Chemical Formula 4,

R'$_1$, R'$_2$, R'$_3$ and R'$_4$ are each independently hydrogen, C$_{1-10}$ alkyl, C$_{1-10}$ alkoxy, or halogen, Z' is C$_{1-10}$ alkylene unsubstituted or substituted with phenyl, C$_{3-15}$ cycloalkylene unsubstituted or substituted with C$_{1-10}$ alkyl, O, S, SO, SO$_2$ or CO.

Further, preferably, the above polycarbonate has a weight average molecular weight of 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight (g/mol) is not more than 34,000, not more than 33,000, or not more than 32,000.

The repeating unit represented by Chemical Formula 4 is formed by reacting the aromatic diol compound and the carbonate precursor. The aromatic diol compound and the carbonate precursor that can be used herein are the same as previously described for the repeating unit represented by Chemical Formula 1.

Preferably, R'$_1$, R'$_2$, R'$_3$, R'$_4$ and Z' in Chemical Formula 4 are the same as previously described for R$_1$, R$_2$, R$_3$, R$_4$ and Z in Chemical Formula 1, respectively.

Further, preferably, the repeating unit represented by Chemical Formula 4 is represented by the following Chemical Formula 4-1:

[Chemical Formula 4-1]

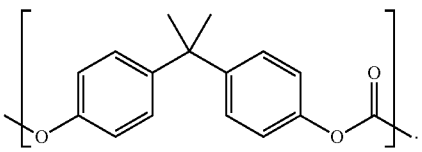

In the polycarbonate composition, the weight ratio of the copolycarbonate and the polycarbonate is preferably from 99:1 to 1:99, more preferably from 90:10 to 50:50, and most preferably from 80:20 to 60:40.

In addition, the present invention provides an article comprising the above-mentioned copolycarbonate or the polycarbonate composition.

Preferably, the above article is an injection molded article. In addition, the article may further comprise, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

The method for preparing the article may comprise the steps of mixing the copolycarbonate according to the present invention and additives such as antioxidants using a mixer, extrusion-molding the mixture with an extruder to produce a pellet, drying the pellet and then injecting the dried pellet with an injection molding machine.

Advantageous Effects

As set forth above, according to the present invention, the copolycarbonate in which a specific siloxane compound is introduced in a main chain of the polycarbonate has characteristics of providing an excellent transparency and a high spiral flow.

DETAILED DESCRIPTION OF THE EMBODIMENTS

Below, preferred embodiments will be provided to assist in the understanding of the invention. However, these examples are provided only for illustration of the present invention, and should not be construed as limiting the present invention by the examples.

Preparation Example 1

Preparation of Polyorganosiloxane (AP-30)

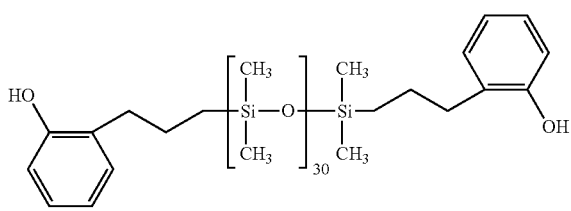

42.5 g (142.8 mmol) of octamethylcyclotetrasiloxane and 2.26 g (16.8 mmol) of tetramethyldisiloxane were mixed. The mixture was then placed in 3 L flask together with 1 part by weight of an acid clay (DC-A3) compared to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the unmodified polyorganosiloxane thus prepared was 30 when confirmed through $^1$H NMR.

To the resulting terminal-unmodified polyorganosiloxane, 9.57 g (71.3 mmol) of 2-allylphenol and 0.01 g (50 ppm) of Karstedt's platinum catalyst were added and reacted at 90° C. for 3 hours. After completion of the reaction, the unreacted polyorganosiloxane was removed by conducting evaporation under the conditions of 120° C. and 1 torr. The terminal-modified polyorganosiloxane thus prepared was designated as AP-30. AP-30 was a pale yellow oil and the repeating unit (n) was 30 when confirmed through $^1$H NMR using a Varian 500 MHz, and further purification was not required.

Preparation Example 2

Preparation of Polyorganosiloxane (MB-60)

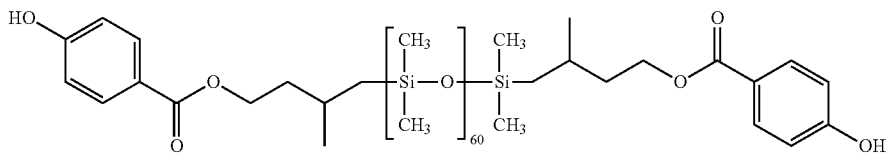

47.60 g (160 mmol) of octamethylcyclotetrasiloxane and 1.5 g (11 mmol) of tetramethyldisiloxane were mixed. The mixture was then introduced in 3 L flask together with 1 part by weight of an acid clay (DC-A3) compared to 100 parts by weight of octamethylcyclotetrasiloxane, and reacted at 60° C. for 4 hours. After completion of the reaction, the reaction product was diluted with ethyl acetate and quickly filtered using a celite. The repeating unit (m) of the unmodified polyorganosiloxane thus prepared was 60 when confirmed through $^1$H NMR.

To the resulting terminal-unmodified polyorganosiloxane, 6.13 g (29.7 mmol) of 3-methylbut-3-enyl 4-hydroxybenzoate and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as MB-60. MB-60 was a pale yellow oil and the repeating unit (m) was 60 when confirmed through $^1$H NMR using a Varian 500 MHz, and further purification was not required.

Preparation Example 3

Preparation of Polyorganosiloxane (Eu-50)

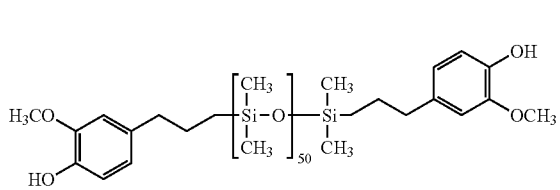

47.60 g (160 mmol) of octamethylcyclotetrasiloxane and 1.7 g (13 mmol) of tetramethyldisiloxane were mixed. The mixture was then placed in 3 L flask together with 1 part by weight of an acid clay (DC-A3) compared to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 50 when confirmed through $^1$H NMR.

To the resulting terminal-unmodified polyorganosiloxane, 6.13 g (29.7 mmol) of Eugenol and 0.01 g (50 ppm) of Karstedt's platinum catalyst were added and reacted at 90° C. for 3 hours. After completion of the reaction, the unreacted siloxane was removed by conducting the evaporation under the conditions of 120° C. and 1 torr. The terminal-modified polyorganosiloxane thus prepared was designated as Eu-50. Eu-50 was a pale yellow oil and the repeating unit (n) was 50 when confirmed through $^1$H NMR using a Varian 500 MHz, and further purification was not required.

Example 1

Step 1: Preparation of Copolycarbonate Resin 978.4 g of Bisphenol A (BPA), 1,620 g of NaOH 32% aqueous solution, and 7,500 g of distilled water were added to 20 L glass reactor. After confirming that BPA was completely dissolved under nitrogen atmosphere, 3,670 g of methylene chloride, 17.5 g of p-tert-butylphenol, and 55.2 g of polyorganosiloxane previously prepared (mixture of 80% by weight of polyorganosiloxane (AP-30) of Preparation Example 1 and 20% by weight of polyorganosiloxane (MB-60) of Preparation Example 2) were added and mixed. To this mixture, 3,850 g of methylene chloride in which 542.5 g of triphosgene was dissolved was added dropwise for one hour. At this time, a NaOH aqueous solution was maintained at pH 12. After completion of the dropwise addition, the reaction product was aged for 15 minutes, and 195.7 g of triethylamine was dissolved in methylene chloride and added. After 10 minutes, pH was adjusted to 3 with 1 N aqueous hydrochloric acid solution and then washed three times with distilled water. Subsequently, the methylene chloride phase was separated, and then precipitated in methanol to give a copolycarbonate resin in the form of a powder. The molecular weight of the resulting copolycarbonate resin was measured by GPC using PC Standard and the result confirmed that the weight average molecular weight was 30,231 g/mol.

2) Preparation of Injection-Molded Specimen

With respect to 1 part by weight of the copolycarbonate resin prepared above, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritoltetrastearate were added, and the resulting mixture was pelletized using a ϕ30 mm twin screw extruder provided with a vent. Thereafter, a specimen was injection-molded using a cylinder temperature of 300° C. and a mold temperature of 80° C. using the N-20C injection molding machine manufactured by JSW Co., Ltd.

Example 2

The copolycarbonate resin and its injection-molded specimen were prepared in the same method as in Example 1, except that the total weight of polyorganosiloxane was 36.8 g (mixture of 80% by weight of polyorganosiloxane (AP-30) of Preparation Example 1 and 20% by weight of polyorganosiloxane (MB-60)).

Comparative Example 1

The copolycarbonate resin and its injection-molded specimen were prepared by the same method as in Example 1, except that only 36.8 g of polyorganosiloxane (AP-30) of Preparation Example 1 was used as polyorganosiloxane.

Comparative Example 2

The copolycarbonate resin and its injection-molded specimen were prepared by the same method as in Example 1, except that only 36.8 g of polyorganosiloxane (Eu-50) of Preparation Example 3 was used as polyorganosiloxane.

Comparative Example 3

The copolycarbonate resin and its injection-molded specimen were prepared by the same method as in Example 1, except that polyorganosiloxane was not used.

Experimental Example

Evaluation of Physical Properties

The weight average molecular weight of the resin prepared in the Examples and Comparative Examples were measured by GPC using PC Standard with Agilent 1200 series.

The physical properties of the specimens prepared with the resins of the Examples and the Comparative Examples were measured in the following manner and the results were shown in Table 1 below.

Weight average molecular weight (g/mol): measured by GPC using PC Standard with Agilent 1200 series.

Melt Index (MI): measured in accordance with ASTM D1238 (300° C., 1.2kg conditions).

Impact strength at room temperature: measured at 23° C. in accordance with ASTM D256 (⅛ inch, Notched Izod).

Impact strength at low-temperature: measured at −30° C. in accordance with ASTM D256 (⅛ inch. Notched Izod).

Transparency (Tt, %): measured in accordance with ASTM D1003 (layer thickness of 3 mm). The equipment used in the measurement and the range of measurement are as follows.

Equipment name: Ultra scan pro (Focus, Inc.)

Measurement range: 350-1050 nm

Repeating units: determined by 1 H-NMR using Varian 500 MHz.

Spiral flow: measured in accordance with ASTM D3123 (300° C., mold temperature of 80° C., capillary thickness of 1.5 mm, holding pressure of 2000 bar). In addition, the value of spiral flow was divided into the value of the melt index (MI).

TABLE 1

|  | Impact strength at room temperature (J/m) | Impact strength at low-temperature (J/m) | Melt index (g/10 min) | Spiral flow (cm) | (Spiral flow)/(Melt index) | Weight average molecular weight (g/mol) | Transparency (%) |
| --- | --- | --- | --- | --- | --- | --- | --- |
| Com. Ex. 1 | 686 | 225 | 15 | 20 | 1.33 | 23,329 | 90.3 |
| Com. Ex. 2 | 802 | 678 | 10 | 15 | 1.50 | 26,166 | 85.2 |
| Com. Ex. 3 | 870 | 194 | 10 | 16 | 1.60 | 31,312 | 91.3 |
| Ex. 1 | 925 | 813 | 6 | 18 | 3.00 | 30,231 | 90.6 |
| Ex. 2 | 826 | 785 | 8 | 20 | 2.50 | 29,842 | 89.9 |

As shown in Table 1 above, the copolycarbonate according to the present invention (Examples 1 and 2) exhibited an excellent transparency while maintaining an excellent impact strength at room temperature. Further, it could be confirmed that the copolycarbonate according to the present invention exhibited a high spiral flow while having a low melt index(MI) compared to the Comparative Examples.

The invention claimed is:

1. A polycarbonate composition comprising:
a polycarbonate; and
a copolycarbonate,
wherein the copolycarbonate comprises: an aromatic polycarbonate-based first repeating unit; and aromatic polycarbonate-based second repeating units having siloxane bonds,
wherein the copolycarbonate has a melt index (MI) of 3 to 9 g/10 min as measured accordance with ASTM D1238 (300° C., 1.2 kg conditions), and a transparency of 87 to 91% as measured in accordance with ASTM D1003 (layer thickness of 3 mm), and
wherein the second repeating units comprise a repeating unit represented by Chemical Formula 2 and a repeating unit represented by Chemical Formula 3:

[Chemical Formula 2]

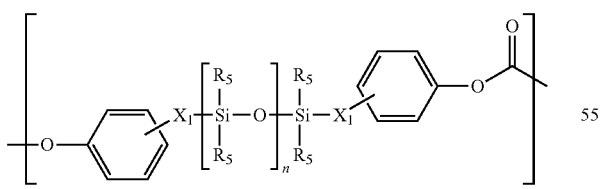

in Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$haloalkyl; or $C_{6-20}$ aryl, and n is an integer of 10 to 50,

[Chemical Formula 3]

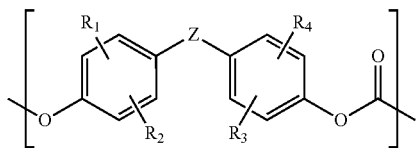

in Chemical Formula 3, each of $X_2$ is independently $C_{1-10}$ alkylene, each of $Y_1$ is independently hydrogen, $C_{1-6}$ alkyl, halogen, hydroxy, $C_{1-6}$ alkoxy, or $C_{6-20}$ aryl, each of $R_6$ is independently hydrogen; or $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$haloalkyl; or $C_{6-20}$ aryl, and m is an integer of 55 to 80.

2. The polvcarhonate composition of claim 1,
wherein the copolycarbonate has a spiral flow of 16 to 25 cm as measured in accordance with ASTM D3123 (300° C., mold temperature of 80° C., capillary thickness of 1.5 mm, holding pressure of 2000 bar).

3. The polycarbonate composition of claim 1,
wherein the copolycarbonate has a ratio of the spiral flow and the melt index (MI) (cm/g/10 min) of 1.7 to 5.0.

4. The polycarbonate composition of claim 1,
wherein the copolycarbonate has a weight average molecular weight of 1,000 to 100,000 g/mol.

5. The polycarbonate composition of claim 1,
wherein the first repeating unit is represented by Chemical Formula 1:

[Chemical Formula 1]

![Chemical Formula 1 structure]

in the Chemical Formula 1,
$R_1$, $R_2$, $R_3$ and $R_4$ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

6. The polycarbonate composition of claim 5,
wherein the repeating unit represented by Chemical Formula 1 is derived from one or more aromatic diol compounds selected from the group consisting of bis (4-hydroxyphenyl)methane, bis(4-hydroxyphenyl) ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)

[Chemical Formula 2-2]

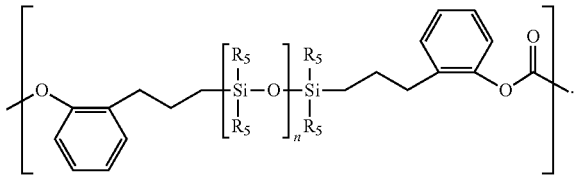

10. The polycarbonate composition of claim 1,
wherein the repeating unit represented by Chemical Formula 3 is represented by the following Chemical Formula 3-2:

[Chemical Formula 3-2]

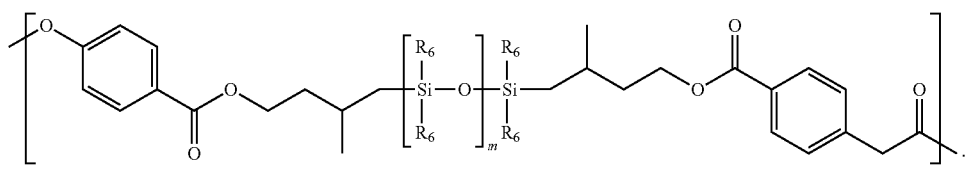

ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl) propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsilaxane.

7. The polycarbonate composition of claim 5,
wherein When Chemical Formula 1 is represented by the following Chemical Formula 1-1:

[Chemical Formula 1-1]

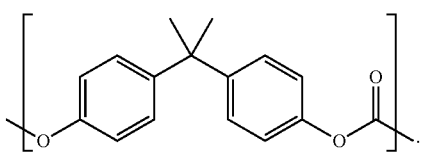

8. The polycarbonate composition of claim 1,
wherein the weight ratio of the repeating unit represented by Chemical Formula 2 and the repeating unit represented by Chemical Formula 3 is from 80:20 to 95:5.

9. The polycarbonate composition of claim 1,
wherein the repeating unit represented by Chemical Formula 2 is represented by the following Chemical Formula 2-2:

11. The polycarbonate composition of claim 1,
wherein the copolycarbonate has an impact strength at low-temperature of 700 to 950 J/m as measured at −30° C. in accordance with ASTM D256 (⅛inch, Notched Izod).

12. The polycarbonate composition of claim 1,
wherein the copolycarbonate has an impact strength at room temperature of 700 to 1000 J/m as measured at 23° C. in accordance with ASTM D256 (⅛inch, Notched Izod).

13. The polycarbonate composition of claim 1,
wherein a polysiloxane structure is not introduced in a main chain of the polycarbonate.

14. The polycarbonate composition of claim 1,
wherein the polycarbonate comprises a repeating unit represented by Chemical Formula 4:

[Chemical Formula 4]

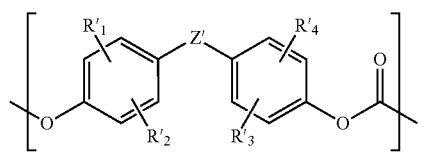

in Chemical Formula 4,
$R'_1$, $R'_2$, $R'_3$ and $R'_4$ are each independently hydrogen, $C_{1-10}$ alkyl, $C_{1-10}$ alkoxy, or halogen, and
Z' is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

* * * * *